United States Patent
Bousquie et al.

(10) Patent No.: US 11,027,267 B2
(45) Date of Patent: Jun. 8, 2021

(54) COBALT COMPOUND USEFUL AS CATALYST FOR HYDROSILYLATION, DEHYDROGENATIVE SILYLATION AND CROSSLINKING OF SILICONE COMPOSITIONS

(71) Applicants: ELKEM SILICONES FRANCE SAS, Lyons (FR); UNIVERSITE CLAUDE BERNARD LYON 1, Villeurbanne (FR); CENTRE NATIONAL DE LA RECHERCHE SCIENTIFIQUE, Paris (FR)

(72) Inventors: Magali Bousquie, Lyons (FR); Vincent Monteil, Lyons (FR); Jean Raynaud, Villeurbanne (FR); Magali Puillet, Lyons (FR)

(73) Assignee: Elkem Silicones France SAS, Lyons (FR)

( * ) Notice: Subject to any disclaimer, the term of this patent is extended or adjusted under 35 U.S.C. 154(b) by 0 days.

(21) Appl. No.: 16/471,984

(22) PCT Filed: Dec. 19, 2017

(86) PCT No.: PCT/FR2017/000250
§ 371 (c)(1),
(2) Date: Jun. 20, 2019

(87) PCT Pub. No.: WO2018/115601
PCT Pub. Date: Jun. 8, 2018

(65) Prior Publication Data
US 2019/0329231 A1    Oct. 31, 2019

(30) Foreign Application Priority Data
Dec. 23, 2016 (FR) .................... 16/01842

(51) Int. Cl.
*C08L 83/04* (2006.01)
*B01J 31/16* (2006.01)
*B01J 31/18* (2006.01)

(52) U.S. Cl.
CPC ....... *B01J 31/1608* (2013.01); *B01J 31/1805* (2013.01); *C08L 83/04* (2013.01); *B01J 2231/323* (2013.01); *B01J 2531/845* (2013.01); *C08L 2312/08* (2013.01)

(58) Field of Classification Search
CPC ............. B01J 31/1608; B01J 31/1805; B01J 2531/845; C07D 213/04; C08L 83/04; C08L 2312/08; C08G 77/12; C08G 77/20
See application file for complete search history.

(56) References Cited

U.S. PATENT DOCUMENTS

2014/0231702 A1    8/2014   Brandstadt et al.
2015/0141647 A1    5/2015   Diao et al.

OTHER PUBLICATIONS

Eichhofer (Inorganic Chemistry, (2014) 53, 1962-1974).*
Noda, Daisuke et al., "Non-Precious-Metal Catalytic Systems Involving Iron or Cobalt Carboxylates and Alkyl Isocyanides for Hydrosilylation of Alkenes with Hydrosiloxanes", Journal of the American Chemical Society, Mar. 2, 2016, pp. 2480-2483, vol. 138, No. 8.
International Search Report of International Application No. PCT/FR2017/000250 dated Feb. 19, 2018.

* cited by examiner

*Primary Examiner* — Kuo Liang Peng
(74) *Attorney, Agent, or Firm* — McBee Moore & Vanik IP, LLC

(57) ABSTRACT

The subject of the present invention is the use, as hydrosilylation and/or dehydrogenative silylation catalyst, of a cobalt compound of formula (1): $[CO(N(SiR_3)_2)_x]_y$, in which: —the R symbols, which are identical or different, represent a hydrogen atom or a hydrocarbon-based radical having from 1 to 12 carbon atoms, and preferably the R symbols, which are identical or different, are chosen from the group consisting of: a hydrogen atom, alkyl groups having from 1 to 8 carbon atoms and aryl groups having from 6 to 12 carbon atoms, —x=1, 2 or 3 and—y=1 or 2.

17 Claims, No Drawings

COBALT COMPOUND USEFUL AS CATALYST FOR HYDROSILYLATION, DEHYDROGENATIVE SILYLATION AND CROSSLINKING OF SILICONE COMPOSITIONS

CROSS-REFERENCE TO RELATED APPLICATIONS

This application is a National Stage entry of International Application No. PCT/FR2017/000250, filed 19 Dec. 2017, which claims priority to French Patent Application No. 16/01842, filed 23 Dec. 2016.

BACKGROUND

Field of the Invention

The field of the invention is that of reactions between an unsaturated compound and a compound comprising at least one hydrogen atom bonded to a silicon atom. They can be hydrosilylation reactions, also known as polyadditions, and/or dehydrogenative silylation reactions. The invention relates to the use of catalysts of a novel type for these reactions. More specifically, the present invention relates to the use of cobalt compounds as hydrosilylation and/or dehydrogenative silylation catalysts. These catalysts also make possible the curing by crosslinking of silicone compositions.

Description of Related Art

During a hydrosilylation reaction (also known as polyaddition), a compound comprising at least one unsaturation reacts with a compound comprising at least one hydrosilyl functional group, that is to say a hydrogen atom bonded to a silicon atom. This reaction can, for example, be described in the case of an unsaturation of alkene type by:

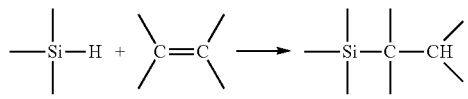

(1)

or in the case of an unsaturation of alkyne type by:

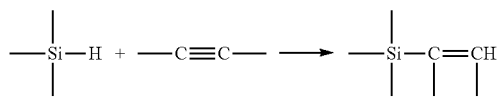

(2)

During a dehydrogenative silylation reaction, the reaction can be described by:

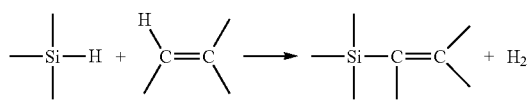

(3)

The hydrosilylation of unsaturated compounds is performed by catalysis. Typically, the appropriate catalyst for this reaction is a platinum catalyst. Currently, the majority of industrial hydrosilylation reactions are catalyzed by the Karstedt platinum complex, of general formula $Pt_2$(divinyltetramethyldisiloxane)$_3$ (or abbreviated to $Pt_2$(DVTMS)$_3$):

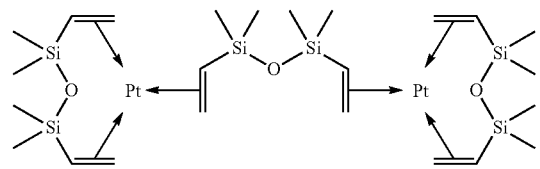

At the start of the 2000s, the preparation of platinum-carbene complexes of general formula:

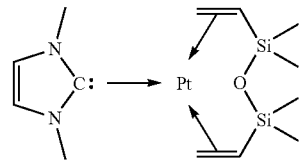

made it possible to access more stable catalysts (see, for example, international patent application WO 01/42258).

However, the use of platinum catalysts is still problematic. It is an expensive metal which is becoming harder to find and the cost of which fluctuates enormously. It is difficult to use on the industrial scale. It would thus be advantageous to have available an alternative to the platinum-catalyzed hydrosilylation reaction. It would be very particularly advantageous to provide a novel type of catalyst for hydrosilylation reactions which does not contain platinum.

It would thus be advantageous to provide alternative catalysts to platinum-based catalysts and to have available novel silicone compositions which can be crosslinked and/or cured by means of catalysts no longer exhibiting the problems described above.

The use of other catalysts has been provided in the past, for example the use of rhodium or iridium. However, these metals are just as rare as platinum and their use does not solve the problems mentioned.

The recently published patent application WO2016/071652 describes complexes of cobalt with β-diketone ligands as hydrosilylation catalysts but the reactivity of such complexes remains lower than that of platinum. The patent application US20140231702 discloses, as hydrosilylation catalyst, the reaction product of a cobalt precursor and of a ligand but the activity of such catalysts is not described.

One of the objectives of the present invention is thus to provide a process for hydrosilylation and/or dehydrogenative silylation between a compound comprising at least one hydrogen atom bonded to a silicon atom and an unsaturated compound which would use a catalyst which is advantageously relatively cheap, is easy to supply and has little or no toxicity. In addition, it is desirable for the hydrosilylation yields obtained with this alternative catalyst to be as high as possible. In this context, one of the objectives of the present invention is to provide a novel catalyst, suitable in particular for the catalysis of hydrosilylation reactions, with a sufficient activity for its an industrial use.

This objective is achieved with the help of a catalyst which is a cobalt compound exhibiting a specific structure.

SUMMARY

These objectives have been achieved by virtue of the use of a cobalt compound as hydrosilylation and/or dehydrogenative silylation catalyst.

A first subject matter of the present invention is the use, as hydrosilylation and/or dehydrogenative silylation catalyst, of a cobalt compound of formula (1):

in which:
the symbols R, which are identical or different, represent a hydrogen atom or a hydrocarbon radical having from 1 to 12 carbon atoms, and preferably the symbols R, which are identical or different, are chosen from the group consisting of: the hydrogen atom, alkyl groups having from 1 to 8 carbon atoms and aryl groups having from 6 to 12 carbon atoms,
x=1, 2 or 3 and
y=1 or 2.

In addition, another subject matter of the invention is a process for preparing hydrosilylation and/or dehydrogenative silylation products by reaction between an unsaturated compound comprising at least one alkene functional group and/or at least one alkyne functional group with a compound comprising at least one hydrosilyl functional group, said process being characterized in that it is catalyzed by a cobalt compound of formula (1) as described above.

Another subject matter of the invention is a composition comprising:
at least one unsaturated compound comprising at least one alkene functional group and/or at least one alkyne functional group,
at least one compound comprising at least one hydrosilyl functional group, and
a cobalt compound of formula (1) as described above.

DETAILED DESCRIPTION OF A PREFERRED EMBODIMENT

Process

A subject matter of the present invention is thus a process for preparing hydrosilylation and/or dehydrogenative silylation products by reaction between an unsaturated compound A comprising at least one alkene functional group and/or at least one alkyne functional group with a compound B comprising at least one hydrosilyl functional group, said process being characterized in that it is catalyzed by a cobalt compound C of formula (1):

in which:
the symbols R, which are identical or different, represent a hydrogen atom or a hydrocarbon radical having from 1 to 12 carbon atoms, and preferably the symbols R, which are identical or different, are chosen from the group consisting of: the hydrogen atom, alkyl groups having from 1 to 8 carbon atoms, cycloalkyl groups having from 3 to 8 carbon atoms and aryl groups having from 6 to 12 carbon atoms,
x=1, 2 or 3 and
y=1 or 2.

In this formula (1), the cobalt can have a degree of oxidation of I, II or III.

It is to the credit of the inventors to have demonstrated that the compounds C of formula (1) as described above could efficiently catalyze hydrosilylation and/or dehydrogenative silylation reactions.

These catalysts in particular exhibit the advantage of not requiring the use of solvents as they exhibit good solubility in silicone oils.

According to one embodiment of the invention, in the process according to the invention, the compound C is a compound of formula (2):

in which:
Co represents cobalt with a degree of oxidation of II and
R is as defined above and
y=1 or 2.

According to a preferred embodiment of the invention, in the process according to the invention, the catalyst C is a compound of formula (3):

in which:
Co represents cobalt with a degree of oxidation of II and
y=1 or 2.

According to an alternative form, the compound C of formula (3) above can be synthesized in situ, in the presence of the unsaturated compound A, by quantitative reaction between $CoCl_2$ and $LiN(SiMe_3)_2$.

The unsaturated compound A used in the process according to the invention is a chemical compound comprising at least one unsaturation not forming part of an aromatic ring. The unsaturated compound A comprises at least one alkene functional group and/or one alkyne functional group. Any compound comprising at least one alkene functional group and/or one alkyne functional group can be used in the process according to the invention, insofar as it does not contain a reactive chemical functional group which may hinder, indeed even prevent, the hydrosilylation reaction.

According to a particularly preferred embodiment, the unsaturated compound A employed in the hydrosilylation process according to the invention comprises from 2 to 40 carbon atoms and one or more alkene or alkyne functional groups.

The unsaturated compound A can, in a preferred way, be chosen from the group consisting of:
acetylene, $C_1$ to $C_4$ alkyl acrylates and methacrylates,
acrylic or methacrylic acid,
$C_4$ to $C_{12}$ alkenes, preferably octene and more preferably 1-octene,
allyl alcohol, allylamine, allyl glycidyl ether, allyl piperidinyl ether, preferably allyl sterically hindered piperidinyl ether,
styrenes, preferably α-methylstyrene, 1,2-epoxy-4-vinylcyclohexane, allyl chloride, chlorinated alkenes, preferably allyl chloride, and
fluorinated alkenes, preferably 4,4,5,5,6,6,7,7,7-nonafluoro-1-heptene.

The unsaturated compound A can be chosen from compounds comprising several alkene functional groups, preferably two or three alkene functional groups, and particularly preferably the compound A is chosen from the following compounds:

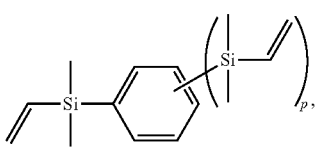

with p having the value 1 or 2,

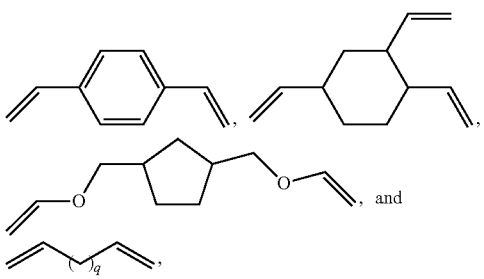

with q having a value from 2 to 6, q preferably having the value 2 or 4.

According to a preferred embodiment, the unsaturated compound A is chosen from organopolysiloxane compounds comprising units of formula (I):

$$Z_g U_h SiO_{(4-(g+h))/2} \quad (I)$$

in which:
the radicals Z, which are identical or different, represent a linear or branched alkenyl or alkynyl radical having from 2 to 6 carbon atoms;
the radicals U, which are identical or different, represent a hydrocarbon radical having from 1 to 12 carbon atoms;
g=1 or 2, h=0, 1 or 2 and g+h=1, 2 or 3;
and optionally comprising other units of formula (II):

$$U_i SiO_{(4-i)/2} \quad (II)$$

in which U has the same meaning as above and i=0, 1, 2 or 3.

It is understood that, in the formula (I) and in the formula (II) above, if several groups U are present, they can be identical to or different from one another. In the formula (I), the symbol g can preferably be equal to 1.

In the formula (I) and in the formula (II), U can represent a monovalent radical chosen from the group consisting of alkyl groups having from 1 to 8 carbon atoms, optionally substituted by at least one halogen atom, such as chlorine or fluorine, cycloalkyl groups having from 3 to 8 carbon atoms and aryl groups having from 6 to 12 carbon atoms. U can advantageously be chosen from the group consisting of methyl, ethyl, propyl, 3,3,3-trifluoropropyl, xylyl, tolyl and phenyl.

Said organopolysiloxanes can be oils with a dynamic viscosity of the order of 10 to 100 000 mPa·s at 25° C., generally of the order of 10 to 70 000 mPa·s at 25° C., or rubbers with a dynamic viscosity of the order of 1 000 000 mPa·s or more at 25° C.

All the viscosities with which the present account is concerned correspond to a "newtonian" dynamic viscosity quantity at 25° C., that is to say the dynamic viscosity which is measured, in a way known per se, with a Brookfield viscometer at a shear rate gradient which is sufficiently low for the viscosity measured to be independent of the rate gradient.

These organopolysiloxanes can exhibit a linear, branched or cyclic structure. Their degree of polymerization is preferably between 2 and 5000.

When they are linear polymers, they are essentially formed of siloxyl units "D" chosen from the group consisting of the siloxyl units $Z_2SiO_{2/2}$, $ZUSiO_{2/2}$ and $U_2SiO_{2/2}$ and of siloxyl units "M" chosen from the group consisting of the siloxyl units $ZU_2SiO_{1/2}$, $Z_2USiO_{1/2}$ and $Z_3SiO_{1/2}$. The symbols Z and U are as described above.

Mention may be made, as examples of terminal units "M", of the trimethylsiloxy, dimethylphenylsiloxy, dimethylvinylsiloxy or dimethylhexenylsiloxy groups.

Mention may be made, as examples of units "D", of the dimethylsiloxy, methylphenylsiloxy, methylvinylsiloxy, methylbutenylsiloxy, methylhexenylsiloxy, methyldecenylsiloxy or methyldecadienylsiloxy groups.

Examples of linear organopolysiloxanes which can be unsaturated compounds A according to the invention are:
a poly(dimethylsiloxane) having dimethylvinylsilyl ends;
a poly(dimethylsiloxane-co-methylphenylsiloxane) having dimethylvinylsilyl ends;
a poly(dimethylsiloxane-co-methylvinylsiloxane) having dimethylvinylsilyl ends; and
a poly(dimethylsiloxane-co-methylvinylsiloxane) having trimethylsilyl ends; and
a cyclic poly(methylvinylsiloxane).

The cyclic organopolysiloxanes which can also be unsaturated compounds A according to the invention are, for example, those formed of siloxyl units "D" of following formulae: $Z_2SiO_{2/2}$, $U_2SiO_{2/2}$ or $ZUSiO_{2/2}$, which can be of the dialkylsiloxy, alkylarylsiloxy, alkylvinylsiloxy or alkylsiloxy type. Said cyclic organopolysiloxanes exhibit a viscosity of the order of 10 to 5000 mPa·s at 25° C.

According to a preferred embodiment, it is possible to employ, in the process according to the invention, a second organopolysiloxane compound comprising, per molecule, at least two $C_2$-$C_6$ alkenyl radicals bonded to silicon atoms, other than the organopolysiloxane compound A, said second organopolysiloxane compound preferably being divinyltetramethylsiloxane (DVTMS).

Preferably, the organopolysiloxane compound A has a content by weight of Si-vinyl units of between 0.001% and 30%, preferably between 0.01% and 10%.

Mention may be made, as other examples of unsaturated compounds A, of silicone resins comprising at least one vinyl radical. For example, they can be chosen from the group consisting of the following silicone resins:
$MD^{Vi}Q$, where the vinyl groups are included in the units D,
$MD^{Vi}TQ$, where the vinyl groups are included in the units D,
$MM^{Vi}Q$, where the vinyl groups are included in a part of the units M,
$MM^{Vi}TQ$, where the vinyl groups are included in a part of the units M,
MMviDDviQ, where the vinyl groups are included in a part of the units M and D,
and their mixtures,
with:
$M^{Vi}$=siloxyl unit of formula $(R)_2(vinyl)SiO_{1/2}$
$D^{Vi}$=siloxyl unit of formula $(R)(vinyl)SiO_{2/2}$
T=siloxyl unit of formula $(R)SiO_{3/2}$
Q=siloxyl unit of formula $SiO_{4/2}$
M=siloxyl unit of formula $(R)_3SiO_{1/2}$
D=siloxyl unit of formula $(R)_2SiO_{2/2}$
and the groups R, which are identical or different, are monovalent hydrocarbon groups chosen from alkyl groups having from 1 to 8 carbon atoms inclusive, such as the methyl, ethyl, propyl and 3,3,3-trifluoropropyl groups, and aryl groups, such as xylyl, tolyl and phenyl. Preferably, the groups R are methyls.

The process according to the invention also employs a compound B comprising at least one hydrosilyl functional group.

Preferably, the compound B comprising at least one hydrosilyl functional group is chosen from the group consisting of:
- a silane or polysilane compound comprising at least one hydrogen atom bonded to a silicon atom,
- an organopolysiloxane compound comprising at least one hydrogen atom bonded to a silicon atom, preferably an organopolysiloxane compound comprising, per molecule, at least two hydrosilyl functional groups, and
- an organic polymer comprising hydrosilyl functional groups in the terminal positions.

In the present invention, "silane" compound is understood to mean chemical compounds comprising a silicon atom bonded to four hydrogen atoms or to organic substituents. In the present invention, "polysilane" compound is understood to mean chemical compounds having at least one ESi-SiE unit.

Mention may be made, among the silane compounds comprising at least one hydrogen atom bonded to a silicon atom, of phenylsilane and triethoxysilane.

The compound B can also be an organopolysiloxane compound comprising at least one hydrogen atom bonded to a silicon atom. In the present invention, the term "organopolysiloxane" compound means chemical compounds bearing at least one ESi—O-SiE unit. The organopolysiloxane compound comprises at least two silicon atoms, preferably at least three or more silicon atoms.

Said compound B can advantageously be an organopolysiloxane comprising at least one unit of formula (III):

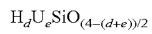

$$H_dU_eSiO_{(4-(d+e))/2} \quad (III)$$

in which:
the radicals U, which are identical or different, represent a hydrocarbon radical having from 1 to 12 carbon atoms;
d=1 or 2, e=0, 1 or 2 and d+e=1, 2 or 3;
and optionally other units of formula (IV):

$$U_fSiO_{(4-f)/2} \quad (IV)$$

in which U has the same meaning as above and f=0, 1, 2 or 3.

It is understood, in the formula (III) and in the formula (IV) above, that, if several groups U are present, they can be identical to or different from one another. In the formula (III), the symbol d can preferably be equal to 1. In addition, in the formula (III) and in the formula (IV), U can represent a monovalent radical chosen from the group consisting of an alkyl group having from 1 to 8 carbon atoms, optionally substituted by at least one halogen atom, such as chlorine or fluorine, alkyl groups having from 1 to 8 carbon atoms, cycloalkyl groups having from 3 to 8 carbon atoms and aryl groups having from 6 to 12 carbon atoms. U can advantageously be chosen from the group consisting of methyl, ethyl, propyl, 3,3,3-trifluoropropyl, xylyl, tolyl and phenyl.

These organopolysiloxanes can exhibit a linear, branched or cyclic structure. The degree of polymerization is preferably greater than or equal to 2. More generally, it is less than 5000. When they are linear polymers, they are essentially formed:

of siloxyl units "D" chosen from the units of following formula $U_2SiO_{2/2}$ or $UHSiO_{2/2}$, and
of siloxyl units "M" chosen from the units of following formula $U_3SiO_{1/2}$ or $U_2HSiO_{1/2}$.

These linear organopolysiloxanes can be oils with a dynamic viscosity of the order of 1 to 100 000 mPa·s at 25° C. and more generally of the order of 10 to 5000 mPa·s at 25° C.

Examples of organopolysiloxanes which can be compounds B according to the invention comprising at least one hydrogen atom bonded to a silicon atom are:
- a poly(dimethylsiloxane) having hydrodimethylsilyl ends;
- a poly(dimethylsiloxane-co-methylhydrosiloxane) having trimethylsilyl ends;
- a poly(dimethylsiloxane-co-methylhydrosiloxane) having hydrodimethylsilyl ends;
- a poly(methylhydrosiloxane) having trimethylsilyl ends; and
- a cyclic poly(methylhydrosiloxane).

When they are cyclic organopolysiloxanes, they are formed of siloxyl units "D" of following formulae $U_2SiO_{2/2}$ and $UHSiO_{2/2}$, which can be of the dialkylsiloxy or alkylarylsiloxy type, or of $UHSiO_{2/2}$ units only. They then exhibit a viscosity of the order of 1 to 5000 mPa·s.

Preferably, the compound B is an organopolysiloxane compound comprising, per molecule, at least two and preferably three hydrosilyl (Si—H) functional groups.

The oligomers and polymers corresponding to the general formula (B.3) are in particular preferred as organohydropolysiloxane compound B:

The following compounds are particularly suitable for the invention as organohydropolysiloxane compound B:

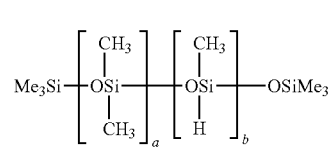

S1

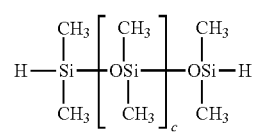

S2

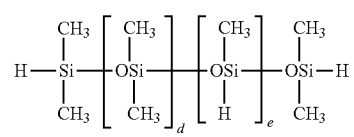

S3 with a, b, c, d and e defined below:
in the polymer of formula S1:
$0 \le a \le 150$, preferably $0 \le a \le 100$ and more particularly $0 \le a \le 20$, and
$1 \le b \le 90$, preferably $10 \le b \le 80$ and more particularly $30 \le b \le 70$,
in the polymer of formula S2: $0 \le c \le 15$,
in the polymer of formula S3: $5 \le d \le 200$, preferably $20 \le d \le 100$ and $2 \le e \le 90$, preferably $10 \le e \le 70$.

In particular, an organohydropolysiloxane compound B suitable for the invention is the compound of formula S1, where a=0.

Preferably, the organohydropolysiloxane compound B has a content by weight of SiH units of between 0.2% and 91%, preferably between 0.2% and 50%.

Finally, the compound B can be an organic polymer comprising hydrosilyl functional groups in the terminal positions. The organic polymer can, for example, be a polyoxyalkylene, a saturated hydrocarbon polymer or a poly(meth)acrylate. Organic polymers comprising reactive functional groups in the terminal positions are described in particular in patent applications US 2009/0182099 and US 2009/0182091.

According to a specific embodiment of the present invention, it is possible for the unsaturated compound A and the compound B comprising at least one hydrosilyl functional group to be one and the same compound, comprising, on the one hand, at least one alkene functional group and/or one alkyne functional group and, on the other hand, at least one hydrogen atom bonded to a silicon atom. This compound can then be described as "difunctional", and it is capable of reacting with itself via a hydrosilylation reaction. The invention can thus also relate to a process for the hydrosilylation of a difunctional compound with itself, said difunctional compound comprising, on the one hand, at least one alkene functional group and/or one alkyne functional group and, on the other hand, at least one silicon atom and at least one hydrogen atom bonded to the silicon atom, said process being characterized in that it is catalyzed by a compound C as described above.

Examples of organopolysiloxanes which can be difunctional compounds are:
- a poly(dimethylsiloxane-co-hydromethylsiloxane-co-vinylmethylsiloxane) having dimethylvinylsilyl ends;
- a poly(dimethylsiloxane-co-hydromethylsiloxane-co-vinylmethylsiloxane) having dimethylhydrosilyl ends; and
- a poly(dimethylsiloxane-co-hydromethylsiloxane-co-(propyl glycidyl ether)methylsiloxane) having trimethylsilyl ends.

When it is a matter of using the unsaturated compound A and the compound B comprising at least one hydrosilyl functional group, a person skilled in the art understands that this is also understood to mean the use of a difunctional compound.

According to another embodiment, the process according to the invention is carried out in the presence of a compound E of following formula (4):

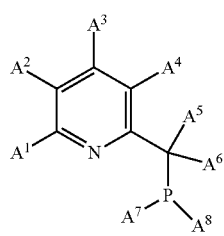
(4)

in which:
$A^1$, $A^2$, $A^3$ and $A^4$ are chosen from: the hydrogen atom, alkyl groups having from 1 to 8 carbon atoms, cycloalkyl groups having from 6 to 12 carbon atoms, aryl groups having from 6 to 12 carbon atoms, halogens and alkoxy groups of formula $OR^1$ where $R^1$ is an alkyl group having from 1 to 8 carbon atoms, $A^5$ and $A^6$ are chosen from: the hydrogen atom, alkyl groups having from 1 to 8 carbon atoms, cycloalkyl groups having from 6 to 12 carbon atoms and aryl groups having from 6 to 12 carbon atoms, and $A^7$ and $A^8$ are chosen from: alkyl groups having from 1 to 8 carbon atoms, cycloalkyl groups having from 6 to 12 carbon atoms, aryl groups having from 6 to 12 carbon atoms and alkoxy groups of formula $OR^1$ where $R^1$ is an alkyl group having from 1 to 8 carbon atoms.

Preferably, in the formula (4) above:

$A^1$, $A^2$, $A^3$ and $A^4$ are hydrogen atoms, $A^5$ and $A^6$ are hydrogen atoms, $A^7$ and $A^8$ are chosen from: alkyl groups having from 1 to 8 carbon atoms, cycloalkyl groups having from 6 to 12 carbon atoms, aryl groups having from 6 to 12 carbon atoms and alkoxy groups of formula $OR^1$ where $R^1$ is an alkyl group having from 1 to 8 carbon atoms and preferably $A^7$ and $A^8$ are chosen from the tert-butyl, isopropyl, methyl, ethyl, phenyl and cyclohexyl groups.

More preferably still, the compound E is chosen from the following compounds of formula (5) to (10):

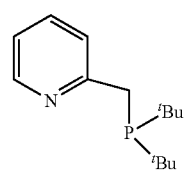
(5)

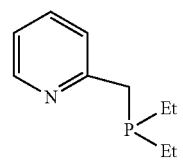
(6)

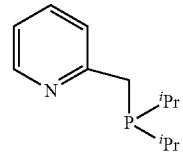
(7)

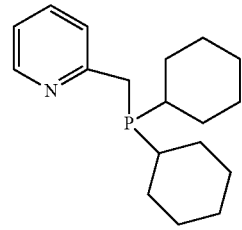
(8)

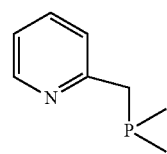
(9)

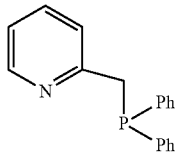

(10)

where $^tBu$=tert-butyl and $^iPr$=isopropyl

Without wishing to be committed to any one theory, the compound C and the compound E can react, partially or completely, to form a compound C' different from C which also catalyzes the hydrosilylation and/or dehydrogenative silylation reactions between the compounds A and B. According to an alternative form of the invention, it is possible to mix the compound C, the compound E and the compound A for a period of time of between a few minutes and several days before the addition of the compound B.

In the process according to the invention, it is possible to employ reducing agents other than the compound B comprising at least one hydrosilyl functional group. Mention may be made, as examples of reducing agents, of metal hydrides, such as $LiAlH_4$, or metal borohydrides, such as $NaEt_3BH$ or $LiEt_3BH$ or $NaBH_4$. These reducing agents are well known to a person skilled in the art. According to another alternative form, the process according to the invention can employ a boron-derived ionic activator, such as, for example, boranes or borates.

Preferably, the process according to the invention does not employ reducing agents or ionic activators.

The process according to the invention can be carried out in the presence or in the absence of solvent. According to a preferred embodiment, the process according to the invention is carried out in the absence of solvent. According to an alternative form of the invention, one of the reactants, for example the unsaturated compound A, can act as solvent.

The process according to the invention can be carried out at a temperature of between 15° C. and 200° C., preferably between 20° C. and 150° C. and more preferably still between 40° C. and 120° C. A person skilled in the art will know how to adjust the reaction temperature depending on the compounds A and B employed in the process according to the invention.

Advantageously, the process of the invention is carried out under an inert atmosphere.

In the process according to the invention, the relative amount of compound A and of compound B can be controlled so as to provide the desired rate of reaction of the unsaturations with hydrosilyl functional groups. The molar ratio R of the hydrosilyl functional groups of the compounds B to the alkene and alkyne functional groups of the compounds A is between 1:5 and 5:1, preferably between 1:3 and 3:1 and more preferably between 1:2 and 2:1.

According to one embodiment of the process according to the invention, the molar ratio R of the hydrosilyl functional groups of the compounds B to the alkene and alkyne functional groups of the compounds A is strictly greater than 1. The hydrosilyl functional groups are then in excess with respect to the unsaturated functional groups. In this case, the hydrosilylation process is then described as partial. It is also possible to speak of partial functionalization. Partial functionalization can be used, for example, in order to obtain silicone oils with hydrosilyl functional groups and epoxy functional groups.

According to another embodiment, the molar ratio of the hydrosilyl functional groups of the compounds B to the alkene and alkyne functional groups of the compounds A is less than or equal to 1. The hydrosilyl functional groups are then in deficit with respect to the unsaturated functional groups.

Advantageously, in the process according to the invention, the molar concentration of compound C is from 0.01% to 10%, preferably from 0.05% to 5% and more preferably from 0.1% to 3%, with respect to the total number of moles of unsaturations carried by the unsaturated compound A.

According to another alternative form, the amount of cobalt employed in the process according to the invention is between 20 and 1000 ppm by weight of the reaction medium, preferably between 20 and 600 ppm and more preferably still between 20 and 400 ppm. The term "reaction medium" is understood here to mean the sum of the compounds A, B, C and optionally E, without taking into account the possible presence of solvent.

When the compound E is present in the process according to the invention, the molar ratio of the compound E to cobalt is advantageously between 0.5 and 4, preferably between 0.8 and 3.5 and more preferably still between 1.5 and 3.

According to a preferred alternative form, in the process according to the invention, compounds based on platinum, palladium, ruthenium or rhodium are not employed.

According to a preferred embodiment of the invention, the compounds A and B employed are chosen from the organopolysiloxanes as defined above. In this case, a three-dimensional network is formed, which results in the curing of the composition. The crosslinking involves a gradual physical change in the medium constituting the composition. Consequently, the process according to the invention can be used to obtain elastomers, gels, foams, and the like. In this case, a crosslinked silicone material Y is obtained. The term "crosslinked silicone material" is understood to mean any silicone-based product obtained by crosslinking and/or curing of compositions comprising organopolysiloxanes having at least two unsaturated bonds and organopolysiloxanes having at least three hydrosilyl units. The crosslinked silicone material Y can, for example, be an elastomer, a gel or a foam.

Still according to this preferred embodiment of the process according to the invention, where the compounds A and B are chosen from the organopolysiloxanes as defined above, it is possible to employ functional additives normal in silicone compositions. Mention may be made, as families of common functional additives, of:
fillers;
adhesion promoters;
inhibitors or retarders of the hydrosilylation reaction;
adhesion modulators;
silicone resins;
consistency-enhancing additives;
pigments; and
heat-resistant, oil-resistant or fire-resistant additives, for example metal oxides.

The fillers optionally provided are preferably inorganic. They can in particular be siliceous. As regards the siliceous materials, they can act as reinforcing or semi-reinforcing filler. The reinforcing siliceous fillers are chosen from colloidal silicas, powders of fumed silica and of precipitated silica, or their mixtures. These powders exhibit a mean particle size generally less than 0.1 µm (micrometers) and a BET specific surface of greater than 30 $m^2/g$, preferably of between 30 and 350 $m^2/g$. Semi-reinforcing siliceous fillers, such as diatomaceous earths or ground quartz, can also be used. As regards the nonsiliceous inorganic materials, they can be involved as semi-reinforcing or bulking inorganic filler. Examples of these nonsiliceous fillers which can be used, alone or as a mixture, are carbon black, titanium dioxide, aluminum oxide, hydrated alumina, expanded vermiculite, non-expanded vermiculite, calcium carbonate optionally surface-treated with fatty acids, zinc oxide, mica, talc, iron oxide, barium sulfate and slaked lime. These fillers have a particle size generally of between 0.001 and 300 μm (micrometers) and a BET specific surface of less than 100 m²/g. In practical but nonlimiting terms, the fillers employed can be a mixture of quartz and silica. The fillers can be treated with any suitable product. In terms of weight, use is preferably made of an amount of filler of between 1% and 50% by weight, preferably between 1% and 40% by weight, with respect to all of the constituents of the composition.

Adhesion promoters are widely used in silicone compositions. Advantageously, in the process according to the invention, it is possible to employ one or more adhesion promoters chosen from the group consisting of:

alkoxylated organosilanes containing, per molecule, at least one $C_2$-$C_6$ alkenyl group, which organosilanes are selected from the products of following general formula:

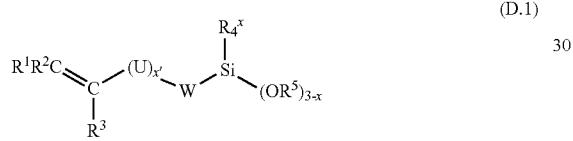
(D.1)

in which formula:
$R^1$, $R^2$ and $R^3$ are hydrogen radicals or hydrocarbon radicals which are identical to or different from one another and represent a hydrogen atom, a linear or branched $C_1$-$C_4$ alkyl or a phenyl optionally substituted by at least one $C_1$-$C_3$ alkyl,
U is a linear or branched $C_1$-$C_4$ alkylene,
W is a valency bond,
$R^4$ and $R^5$ are identical or different radicals and represent a linear or branched $C_1$-$C_4$ alkyl,
x'=0 or 1, and
x=0 to 2.

organosilicon compounds comprising at least one epoxy radical, which compounds are chosen from:
a) the products (D.2a) corresponding to the following general formula:

(D.2a)

in which formula:
$R^6$ is a linear or branched $C_1$-$C_4$ alkyl radical,
$R^7$ is a linear or branched $C_1$-$C_4$ alkyl radical,
y is equal to 0, 1, 2 or 3, and X being defined by the following formula:

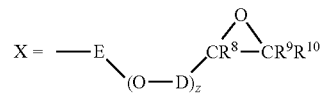

with:
E and D which are identical or different radicals chosen from linear or branched $C_1$-$C_4$ alkyls,
z which is equal to 0 or 1,
$R^8$, $R^9$ and $R^{10}$ which are identical or different radicals representing a hydrogen atom or a linear or branched $C_1$-$C_4$ alkyl, and
$R^8$ and $R^9$ or $R^{10}$ which can alternatively constitute, together and with the two carbons carrying the epoxy, a 5- to 7-membered alkyl ring, or
b) the products (D.2b) formed by epoxy-functional polydiorganosiloxanes comprising:
(i) at least one siloxyl unit of formula (D.2 bi):

(D.2 bi)

in which formula:
X is the radical as defined above for the formula (D.2 a)
G is a monovalent hydrocarbon group chosen from alkyl groups having from 1 to 8 carbon atoms inclusive, optionally substituted by at least one halogen atom, and also from aryl groups containing between 6 and 12 carbon atoms,
p=1 or 2,
q=0, 1 or 2,
p+q=1, 2 or 3, and
(ii) optionally at least one siloxyl unit of formula (D.2 bii)

(D.2 bii)

in which formula:
G has the same meaning as above and
r is equal to 0, 1, 2 or 3,
organosilicon compounds comprising at least one hydrosilyl functional group and at least one epoxy radical and
metal M chelates and/or metal alkoxides of general formula:

$M(OJ)_n$, in which

M is chosen from the group formed by: Ti, Zr, Ge, Li, Mn, Fe, Al and Mg or their mixtures,
n=valency of M and J=linear or branched $C_1$-$C_8$ alkyl.
Preferably, M is chosen from the following list: Ti, Zr, Ge, Li or Mn, and more preferably still the metal M is titanium. It can be combined, for example, with an alkoxy radical of butoxy type.

Silicone resins are branched organopolysiloxane oligomers or polymers which are well known and commercially available. They exhibit, in their structure, at least two different units chosen from those of formula $R_3SiO_{1/2}$ (unit M), $R_2SiO_{2/2}$ (unit D), $RSiO_{3/2}$ (unit T) and $SiO_{4/2}$ (unit Q), at least one of these units being a unit T or Q.

The radicals R are identical or different and are chosen from linear or branched $C_1$-$C_6$ alkyl, hydroxyl, phenyl or 3,3,3-trifluoropropyl radicals. Mention may be made, for example, as alkyl radicals, of the methyl, ethyl, isopropyl, tert-butyl and n-hexyl radicals.

Mention may be made, as examples of branched organopolysiloxane oligomers or polymers, of MQ resins, MDQ resins, TD resins and MDT resins, it being possible for the hydroxyl functional groups to be carried by the units M, D and/or T. Mention may be made, as examples of resins which are particularly well suited, of hydroxylated MDQ resins having a content by weight of hydroxyl groups of between 0.2% and 10% by weight.

Use as Catalyst

The invention also relates to the use of a compound C of formula (1), (2) or (3) as defined above as catalyst for hydrosilylation and/or dehydrogenative silylation between an unsaturated compound A and a compound B comprising at least one hydrosilyl functional group as are defined above.

According to a specific embodiment, the invention also relates to the use of a compound C of formula (1), (2) or (3) in the presence of a compound E of formula (4) as are defined above as catalyst for hydrosilylation and/or dehydrogenative silylation between an unsaturated compound A and a compound B comprising at least one hydrosilyl functional group as are defined above.

According to one embodiment, when the compounds A and B are organopolysiloxanes as are defined above, another subject matter of the invention is the use of the compound C of formula (1), (2) or (3) as defined above, optionally in the presence of a compound E of formula (4) as defined above, as catalyst for the crosslinking of silicone compositions.

According to one embodiment, the compound C and the compound E can be brought into contact before they are used as catalyst for hydrosilylation, for dehydrogenative silylation and/or for crosslinking of silicone compositions.

Composition

Another subject matter of the present invention is a composition X comprising:
 at least one unsaturated compound A comprising at least one alkene functional group and/or one alkyne functional group as defined above,
 at least one compound B comprising at least one hydrosilyl functional group as defined above, and
 a compound C of formula (1), (2) or (3) as defined above.

According to an advantageous embodiment, the composition according to the invention also comprises a compound E of formula (4) as defined above.

According to another embodiment, the composition according to the invention can additionally comprise a compound C' obtained by reaction between the compound C and the compound E.

According to another embodiment of the invention, the composition X is a crosslinkable composition comprising:
 at least one organopolysiloxane compound A comprising, per molecule, at least two $C_2$-$C_6$ alkenyl radicals bonded to silicon atoms,
 at least one organohydropolysiloxane compound B comprising, per molecule, at least two hydrogen atoms bonded to an identical or different silicon atom,
 at least one compound C as defined above, and
 optionally at least one compound E as defined above.

According to a preferred embodiment of the invention, the composition X according to the invention is a crosslinkable composition, in which:
 a) the unsaturated compound A is chosen from organopolysiloxane compounds comprising units of formula (I):

$$Z_g U_h SiO_{(4-(g+h))/2} \quad (I)$$

in which:
 the radicals Z, which are identical or different, represent a linear or branched alkenyl or alkynyl radical having from 2 to 6 carbon atoms;
 the radicals U, which are identical or different, represent a hydrocarbon radical having from 1 to 12 carbon atoms;
 g=1 or 2, h=0, 1 or 2 and g+h=1, 2 or 3;
 and optionally comprising other units of formula (II):

$$U_i SiO_{(4-i)/2} \quad (II)$$

in which U has the same meaning as above and i=0, 1, 2 or 3.

b) the compound B is chosen from organopolysiloxanes comprising at least one unit of formula (III):

$$H_d U_e SiO_{(4-(d+e))/2} \quad (III)$$

in which:
 the radicals U, which are identical or different, represent a hydrocarbon radical having from 1 to 12 carbon atoms;
 d=1 or 2, e=0, 1 or 2 and d+e=1, 2 or 3;
and optionally other units of formula (IV):

$$U_f SiO_{(4-f)/2} \quad (IV)$$

in which U has the same meaning as above and f=0, 1, 2 or 3.

The compound C can in particular be present in the composition X according to the invention in a content ranging from 0.01 to 7 mol % of cobalt per number of moles of $C_2$-$C_6$ alkenyl radicals bonded to silicon atoms in the organopolysiloxane compound A, preferably from 0.05% to 5% and more preferably from 0.1% to 3%.

The composition X according to the invention is preferably devoid of catalyst based on platinum, on palladium, on ruthenium or on rhodium. "Devoid" of catalyst other than the catalyst C is understood to mean that the composition X according to the invention comprises less than 0.1% by weight of catalyst other than the catalyst C, preferably less than 0.01% by weight and more preferably less than 0.001% by weight, with respect to the total weight of the composition.

According to a specific embodiment, the composition X according to the invention also comprises one or more functional additives normal in silicone compositions. Mention may be made, as families of common functional additives, of:
 fillers;
 adhesion promoters;
 inhibitors or retarders of the hydrosilylation reaction;
 adhesion modulators;
 silicone resins;
 consistency-enhancing additives;
 pigments; and
 heat-resistance, oil-resistance or fire-resistance additives, for example metal oxides.

The compositions X according to the invention can in particular be obtained by introducing, under an inert atmosphere, first the compound C into the reaction medium, optionally followed by the compound E, and then by adding the compound A with stirring. Finally, the compound B is introduced and the temperature of the mixture is increased in order to reach the reaction temperature.

Another subject matter of the invention is a crosslinked silicone material Y obtained by heating, to a temperature ranging from 15 to 200° C., preferably from 20 to 150° C. and more preferably from 40 to 120° C., a crosslinkable composition X comprising:
- at least one organopolysiloxane compound A comprising, per molecule, at least two $C_2$-$C_6$ alkenyl radicals bonded to silicon atoms,
- at least one organohydropolysiloxane compound B comprising, per molecule, at least two hydrogen atoms bonded to an identical or different silicon atom,
- at least one compound C as defined above, and
- optionally at least one compound E as defined above.

The present invention is illustrated in greater detail in the nonlimiting implementational examples.

EXAMPLES

Reactants
a) A-1 1-Octene of Alfa Aesar origin: purity 97%.
   A-2 Divinyltetramethylsiloxane (DVTMS) with 1.073 mol of vinyl radicals bonded to the silicon per 100 g de DVTMS.
   A-3 Organopolysiloxane of formula $M^{vi}D_{70}M^{vi}$ with 0.038 mol of vinyl radicals bonded to the silicon per 100 g, with: Vi: Vinyl; $M^{vi}$: $(CH_3)_2ViSiO_{1/2}$ and D: $(CH_3)_2SiO_{2/2}$.
b) B-1 Organohydropolysiloxane of formula MD'M with M: $(CH_3)_3SiO_{1/2}$; and D': $(CH_3)HSiO_{2/2}$.
   B-2 Organohydropolysiloxane of mean formula $MD'_{50}M$ with M and D' as above.
   B-3 Organohydropolysiloxane composed of units M, M', D and D' with an SiH content of approximately 20% by weight.
c) Cobalt compounds of following formulae:
   (C-1) Cobalt bis(trimethylsilyl)amide of formula 2, $[Co(N(SiMe_3)_2)_2]_2$, commercial product, supplier: Strem, purity 98%.
   (C-2) Cobalt bis(trimethylsilyl)amide, synthesized from $CoCl_2$ and $LiN(SiMe_3)_2$ and not purified.
   (C-3) Cobalt bis(trimethylsilyl)amide, formed in situ by addition of $CoCl_2$ and $LiN(SiMe_3)_2$ to the reaction medium.

d) Other compounds

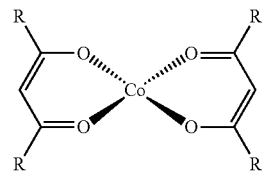

(D-1)=$[Co(TMHD)_2]$ when R=tert-butyl, supplier: Alfa Aesar.
(D-2)=$[Co(acac)_2]$ when R=Methyl, supplier: Sigma-Aldrich.
(D-3) Lanthanum tris(trimethylsilyl)amide of formula $La(N(SiMe_3)_2)_3$, supplier: Strem.

e) Organic compounds E
   E1: 2-(Di(t-butyl)phosphinomethyl)pyridine, supplier: Strem.
   E2: 2,6-Bis(di(t-butyl)phosphinomethyl)pyridine, supplier: Strem.
   E3: 1,10-Phenanthroline, supplier: Strem.

1/Hydrosilylation of Octene by MD'M
Procedure
For all the tests, the catalyst is weighed and introduced into a glass flask under an inert atmosphere in a glove box. The 1-octene and then the compound comprising a hydrosilyl bond (MD'M) are subsequently added, still under an inert atmosphere.

The flask is placed under stirring in an oil bath which will be heated to the desired reaction temperature.

The ratio R corresponds, for these tests, to the number of moles of MD'M to the number of moles of octene and the concentration of catalyst is expressed as molar % of catalyst, with respect to the number of alkene bonds.

The reaction medium is analyzed by gas chromatography (GC).

For the reaction for the hydrosilylation of octene, the activity of the catalyst is determined quantitatively by GC from the conversion of 1-octene. The selectivities for reaction products are expressed as % area with respect to the total area of the products formed, determined by GC and GC-MS.

Comparison of $[Co(N(SiMe_3)_2)_2]_2$ with other catalysts of the prior art for the hydrosilylation of 1-Octene The ratio R corresponding to the molar ratio of the organohydropolysiloxane (MD'M) to the 1-octene is 1:1. The concentration of catalyst is 0.5 molar %, with respect to the mol of 1-octene. The results are presented in the following table 1.

TABLE 1

| | Hydrosilylation of 1-octene by MD'M | | | |
|---|---|---|---|---|
| | Test | | | |
| | 1 Invention | 2 Comparative | 3 Comparative | 4 Comparative |
| Catalyst | (C-1) $[Co(N(SiMe_3)_2)_2]_2$ | (D-2) $Co(acac)_2$ | (D-1) $Co(TMHD)_2$ | (D-3) $La(N(SiMe_3)_2)_3$ |
| Temperature (° C.) | 75 | 90 | 90 | 90 |
| Degree of octene conversion at t = 24 h (%) | 100 | 18 | 14 | 0 |
| | Selectivities (%) at t = 24 h | | | |
| Hydrosilylation | 42 | 0 | 10 | 0 |
| Dehydrogenative silylation | 7 | 3.8 | 9 | 0 |
| 1-Octene isomerization | 45 | 4.6 | 12 | 0 |
| 1-Octene dimerization | 0 | 26 | 9 | 0 |

Cobalt bis(trimethylsilyl)amide is the most effective compound as hydrosilylation catalyst. At 75° C., the total conversion of the octene takes place from 4 h, whereas, with the two other cobalt compounds, it is less than 20% after reacting at 90° C. for 24 h. With lanthanum tris(trimethylsilyl)amide, no conversion is observed.

Addition of Organic Compound

Under the same operating conditions as the preceding tests, a compound E1 which is 2-(di(t-butyl)phosphinomethyl) pyridine was added to the reaction medium after the cobalt bisamide. The molar ratio of the compound E1 to the cobalt is shown in the following table 3.

TABLE 3

|  | Test | | | | | |
| --- | --- | --- | --- | --- | --- | --- |
|  | 1 Invention | 7 Invention | 5 Invention | 8 Invention | 6 Invention | 9 Invention |
| Catalyst | (C-1) | (C-1) | (C-2) | (C-2) | (C-3) | (C-3) |
| Molar ratio E1/Co | 0 | 1 | 0 | 1 | 0 | 1 |
| Température (° C.) | 75 | 75 | 75 | 75 | 75 | 75 |
| Time for reaching 95% octene conversion (h) | 2 | 0.5 | ND | 0.5 | ND | 0.5 |
| Octene conversion at t = 24 h (%) | 100 | 99 | 100 | 99 | 98 | 98 |
| Selectivities (%) | | | | | | |
| Hydrosilylation | 42 | 90 | 37 | 87 | 41 | 84 |
| Dehydrogenative silylation | 7 | 1 | 5 | 2 | 10 | 1 |
| 1-Octene isomerization | 45 | 5 | 52 | 10 | 43 | 13 |
| Alkene dimerization | 0 | 0 | 0 | 0 | 5 | 5 |

The catalyst according to the invention also results in the best selectivity for hydrosilylation product (49%), versus 0% and 10% respectively for comparative tests 2 and 3.
The results obtained with the different cobalt bis(trimethylsilyl)amides, whether commercial available, synthesized in the laboratory or formed in situ in the reaction medium, are presented in the following table 2. The ratio R, corresponding to the molar ratio of the organohydropolysiloxane (MD'M) to the 1-octene, is 1:1 and the concentration of catalyst is 0.5 molar %, with respect to the mol of 1-octene. For test 5, the $Co(N(SiMe_3)_2)_2$ (C-2) was synthesized by reaction between $CoCl_2$ and $LiN(SiMe_3)_2$ in diethyl ether. At the end of the reaction, the diethyl ether was evaporated under vacuum. The unpurified reaction product comprising the LiCl salts was used as is.

For test 6, the $Co(N(SiMe_3)_2)_2$ (C-3) was formed in situ by addition of the equimolar amount of $CoCl_2$ and $LiN(SiMe_3)_2$ to the reaction medium.

TABLE 2

|  | Test | | |
| --- | --- | --- | --- |
|  | 1 Invention | 5 Invention | 6 Invention |
| Catalyst | (C-1) | (C-2) | (C-3) |
| Température (° C.) | 75 | 75 | 75 |
| Degree of octene conversion at t = 24 h (%) | 100 | 100 | 98 |
| Selectivities (%) | | | |
| Hydrosilylation | 42 | 37 | 41 |
| Dehydrogenative silylation | 7 | 5 | 10 |
| 1-Octene isomerization | 45 | 52 | 43 |
| 1-Octene dimerization | 0 | 0 | 5 |

The unpurified reaction product of $CoCl_2$ and $LiN(SiMe_3)_2$ or the direct addition to the reaction medium of $CoCl_2$ and $LiN(SiMe_3)_2$ make it possible to obtain an activity and selectivity comparable to those of commercial [Co(N(SiMe_3)_2)_2]_2.

The addition of the compound E1 makes it possible to convert the octene four times faster. Furthermore, the selectivity for hydrosilylation product is greatly improved whatever the nature of the cobalt bis(trimethylsilyl)amide employed.

Addition of a Reducing Aslant

We have measured the impact of the addition of a reducing agent, such as $NaHBEt_3$. The reducing agent is added after the catalyst and the compound E1 but before the reactants. The concentration of catalyst is 0.5 molar %, with respect to the mol of 1-octene. The results are presented in the following table 4.

TABLE 4

|  | Test | | |
| --- | --- | --- | --- |
|  | 1 Invention | 7 Invention | 10 Comparative |
| Catalyst | (C-1) | (C-1) | (C-1) |
| Molar ratio E1/Co | 0 | 1 | 1 |
| No. mol of NaHBEt$_3$/Co | 0 | 0 | 2 |
| Temperature (° C.) | 75 | 75 | 75 |
| Time for reaching 95% octene conversion (h) | 2 | 0.5 | 0.5 |
| Octene conversion at t = 24 h (%) | 100 | 99 | 100 |
| Selectivities (%) at t = 24 h | | | |
| Hydrosilylation | 42 | 90 | 79 |
| Dehydrogenative silylation | 7 | 1 | 1 |
| 1-Octene isomerization | 45 | 5 | 14 |
| Alkene dimerization | 0 | 0 | 3 |

The addition of reducing agent does not increase the reactivity of the system.

2/Hydrosilylation of Divinyltetramethyldisiloxane (DVTMS) by MD'M

Procedure

The tests take place in an identical way to the preceding ones, the 1-octene being replaced with divinyltetramethyldisiloxane (DVTMS). For all of the tests, the concentration of catalyst C-1 is 0.5 molar %, with respect to the number of moles of vinyl functional groups.

TABLE 5

| | Test | | |
|---|---|---|---|
| | 11 Invention | 12 Invention | 13 Invention |
| Molar ratio E1/Co | 0 | 1 | 0 |
| Temperature (° C.) | 75 | 75 | 75 |
| Molar ratio R SiH:SiVi | 1 | 1 | 2 |
| DVTMS conversion at t = 24 h (%) | 100 | 100 | 100 |
| Time for reaching 95% DVTMS conversion (h) | 4 | 0.5 | 1 |
| Selectivities (%) | | | |
| Hydrosilylation | 23 | 31 | 32 |
| Dehydrogenative silylation | 46 | 55 | 43 |

Cobalt bis(trimethylsilyl)amide catalyzes the hydrosilylation and the dehydrogenative silylation of DVTMS. The addition of the compound E1 significantly accelerates the reaction. The time necessary to convert 95% of the DVTMS is divided by 8. On the other hand, the addition of compound E1 does not appear to have much impact on the selectivity. The increase in the molar ratio R SiH:SiVi from 1 to 2 makes it possible to reduce by four the time necessary to convert 95% of the octene.

3/Crosslinking of Silicone Compositions: Reaction Between the Vinylated Organopolysiloxane A-3 of Formula $M^{vi}D_{70}M^{vi}$ and the Hydrogenated Organopolysiloxane B-2 of Mean Formula $MD'_{50}M$.

Procedure:

The different catalysts tested are weighed in a glove box, in a closed pillbox. The compound E1 is optionally subsequently added. The vinylated organopolysiloxane A-3 is then introduced and stirring is carried out at ambient temperature for 15 minutes. Subsequently, the hydrogenated organopolysiloxane B-2 is added, the mixture is then heated to the desired temperature and stirring is maintained via a magnetic bar.

The start of crosslinking, defined as being the time necessary for stopping the stirring due to an increase in the viscosity of the medium, is measured.

For all of the tests, unless otherwise indicated in the tables, the molar ratio R Si—H:Si-Vi is 2:1 and the concentration of catalyst is 1 molar %, with respect to the number of moles of vinyl radicals bonded to the silicon, i.e. approximately 260 ppm by weight of cobalt in the reaction medium.

TABLE 6

| | Test | | | |
|---|---|---|---|---|
| | 14 Invention | 15 Invention | 16 Comparative | 17 Comparative |
| Catalyst | (C-1) | (A-1) | Co(acac)$_2$ | La(N(SiMe$_3$)$_2$)$_3$ |
| Compound E1 Equivalents E1/Co | No | 2 | No | No |
| Temperature (° C.) | 90 | 90 | 110 | 110 |
| Time when stirring stops☐TWSS | 40 min | 20 min | 40 min | No crosslinking after 48 h |

Cobalt bis(trimethylsilyl)amide is a good catalyst for the crosslinking of silicone compositions. The addition of the compound E1 makes it possible to accelerate the crosslinking.

The addition of other organic compounds E2 and E3 was tested under the same conditions. The results are presented in the following table 7.

TABLE 7

| | Test | | | |
|---|---|---|---|---|
| | 14 Invention MP91-1 | 15 Invention MP95-4 | 16 Comparative MP91-2 | 17 Comparative MP91-4 |
| Catalyst | (C-1) | (C-1) | (C-1) | (C-1) |
| Nature of the compound E | None | E1 = PN | E2 = PNP | E3 = 1,10-Phenanthroline |
| Molar equivalents E/Co | 0 | 2 | 1.8 | 2.1 |
| Temperature (° C.) | 90 | 90 | 90 | 90 |
| Time when stirring stops☐TWSS | 40 min | 20 min | No stopping of stirring in 24 h | No stopping of stirring in 24 h |

The compounds E2 and E3 have a harmful effect on the crosslinking catalyst. It is not possible to measure a time when stirring stops after 24 h. On the other hand, the addition of compound E1 makes it possible to increase the activity of the catalyst, the time necessary to obtain a crosslinking sufficient to stop the stirring being reduced by 50%.

The impact of the content of compound E1 used can be seen in the following table 8. For these tests, the temperature is set at 70° C., the catalyst is cobalt bis(trimethylsilyl)amide C-1, the molar ratio R Si—H:Si-Vi is 2:1 and the concentration of catalyst is 1 molar %, with respect to the number of moles of vinyl radicals bonded to the silicon, i.e. 260 ppm by weight of cobalt in the reaction medium.

TABLE 8

| | Test | | | |
|---|---|---|---|---|
| | 18 Invention | 19 Invention | 20 Invention | 21 Invention |
| Equivalents E1/Co | 0 | 1 | 2 | 3 |
| Time when stirring stops☐ TWSS | 2 h 15 min | 2 h | 1 h 20 min | 1 h 30 min |

At 70° C., the addition of compound E1 makes it possible to reduce the time necessary in order to obtain stopping of the stirring. The optimum appears reached for a compound E1:cobalt molar ratio equal to 2.

Impact of the Temperature with and without Addition of Compound E1

For these tests, the catalyst is cobalt bis(trimethylsilyl)amide C-1, the molar ratio R Si—H:Si-Vi is 2:1 and the concentration of catalyst is 1 molar %, with respect to the number of moles of vinyl radicals bonded to the silicon, i.e. 260 ppm by weight of cobalt in the reaction medium.

TABLE 9

| | Test | | | | | |
|---|---|---|---|---|---|---|
| | 22 Invention | 23 Invention | 14 Invention | 15 Invention | 24 Invention | 25 Invention |
| Temperature (° C.) | 30 | | 90 | | 110 | |
| Equivalents E1/Co | 0 | 2 | 0 | 2 | 0 | 2 |
| Time when stirring stops ◻ TWSS | 115 h | 20 h | 40 min | 20 min | <10 min | <10 min |

At 30, 70 and 90° C., the impact of the compound E1 on the activity of the catalytic system is significant. In particular at ambient temperature, where the crosslinking takes place in less than 24 h in the presence of the compound E1, whereas, without compound E1, virtually 5 days are needed.

At the highest temperatures (110° C.), the impact on the activity of the addition of the compound E1 was not demonstrated as the test is not sufficiently appropriate.

Impact of the Concentration of Catalyst and of the Molar Ratio Si—H:Si-Vi at T=90° C.

TABLE 10

| | Test | | | | | |
|---|---|---|---|---|---|---|
| | 26 Invention | 27 Invention | 14 Invention | 28 Invention | 15 Invention | 29 Invention |
| Catalyst (mol %*) | 1 | 1 | 1 | 1 | 1 | 0.5 |
| Addition compound E1 (equiv/Co) | no | no | no | 1.4 | 2 | 1.4 |
| ppm Co | 240 | 240 | 260 | 230 | 230 | 130 |
| Molar ratio R Si—H:Si—Vi | 4:1 | 2.8:1 | 2:1 | 3.8:1 | 2:1 | 2.5:1 |
| Time when stirring stops◻TWSS | 25 min | 30 min | 40 min | 15 min | 20 min | 45 min |

*with respect to the number of moles of vinyl functional groups

The addition of compound E1 results in a faster crosslinking, whatever the ratio R SiH:SiVi tested.

In the absence of compound E1, the increase in the ratio R SiH:SiVi results in an increase in the rate of crosslinking of the mixture.

Impact of the Nature of the Organohydropolysiloxane

Test 14 was redone, the organohydropolysiloxane B-2 being replaced with B-3. The conditions of the test are otherwise unchanged. It is shown in the following table 11 that the crosslinking of the composition takes place.

TABLE 11

| | Test | |
|---|---|---|
| | 14 Invention | 30 Invention |
| Catalyst | C-1 | C-1 |
| SiH oil | B-2 | B-3 |
| Temperature | 90° C. | 90° C. |
| Time when stirring stops◻TWSS | 40 min | 1 h 45 |

The invention claimed is:

1. A process for preparing hydrosilylation and/or dehydrogenative silylation products by reaction between an unsaturated compound A comprising at least one alkene functional group and/or at least one alkyne functional group with a compound B comprising at least one hydrosilyl functional group, wherein said process is catalyzed by a cobalt compound C of formula (1):

$$[Co(N(SiR_3)_2)_x]_y \qquad (1)$$

in which:
the symbols R, which are identical or different, represent a hydrogen atom or a hydrocarbon radical having from 1 to 12 carbon atoms,
x=1, 2 or 3, and
y=1 or 2.

2. The process as claimed in claim 1, in which the compound C has the formula (2):

$$[Co(N(SiR_3)_2)_2]_y \qquad (2)$$

in which:
Co represents cobalt with a degree of oxidation of II;
the symbols R, which are identical or different, represent a hydrogen atom or a hydrocarbon radical having from 1 to 12 carbon atoms, and
y=1 or 2.

3. The process as claimed in claim 1, in which the compound C has the formula (3):

$$[Co(N(Si(CH_3)_3)_2)_2]_y \qquad (3)$$

in which:
Co represents cobalt with a degree of oxidation of II and
y=1 or 2.

4. The process as claimed in claim 1, carried out in the presence of a compound E of following formula (4):

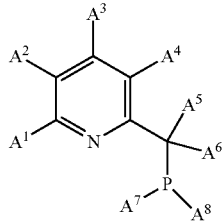

(4)

in which:
A¹, A², A³ and A⁴ are chosen from: the hydrogen atom, alkyl groups having from 1 to 8 carbon atoms, cycloalkyl groups having from 6 to 12 carbon atoms, aryl groups having from 6 to 12 carbon atoms, halogens, and alkoxy groups of formula OR¹ where R¹ is an alkyl group having from 1 to 8 carbon atoms,
A⁵ and A⁶ are chosen from: the hydrogen atom, alkyl groups having from 1 to 8 carbon atoms, cycloalkyl groups having from 6 to 12 carbon atoms, and aryl groups having from 6 to 12 carbon atoms, and
A⁷ and A⁸ are chosen from: alkyl groups having from 1 to 8 carbon atoms, cycloalkyl groups having from 6 to 12 carbon atoms, aryl groups having from 6 to 12 carbon atoms, and alkoxy groups of formula OR¹ where R¹ is an alkyl group having from 1 to 8 carbon atoms.

5. The process as claimed in claim 4, in which:
A¹, A², A³ and A⁴ are hydrogen atoms,
A⁵ and A⁶ are hydrogen atoms,
A⁷ and A⁸ are chosen from: alkyl groups having from 1 to 8 carbon atoms, cycloalkyl groups having from 6 to 12 carbon atoms, aryl groups having from 6 to 12 carbon atoms, and alkoxy groups of formula OR¹ where R¹ is an alkyl group having from 1 to 8 carbon atoms.

6. The process as claimed in claim 4, in which the molar ratio of the compound E to cobalt is between 0.5 and 4.

7. The process as claimed in claim 1, in which the molar concentration of compound C is from 0.01% to 10% with respect to the total number of moles of unsaturations carried by the unsaturated compound A.

8. The process as claimed in claim 1, wherein said process does not employ compounds based on platinum, palladium, ruthenium or rhodium.

9. The process as claimed in claim 1, in which the unsaturated compound A comprises from 2 to 40 carbon atoms and one or more alkene or alkyne functional groups.

10. The process as claimed in claim 1, in which the compound B comprising at least one hydrosilyl functional group is chosen from the group consisting of:
a silane or polysilane compound comprising at least one hydrogen atom bonded to a silicon atom,
an organopolysiloxane compound comprising at least one hydrogen atom bonded to a silicon atom, and
an organic polymer comprising hydrosilyl functional groups in the terminal positions.

11. The process as claimed in claim 1, in which:
a) the unsaturated compound A is chosen from organopolysiloxane compounds comprising units of formula (I):

in which:
the radicals Z, which are identical or different, represent a linear or branched alkenyl or alkynyl radical having from 2 to 6 carbon atoms;
the radicals U, which are identical or different, represent a hydrocarbon radical having from 1 to 12 carbon atoms;
g=1 or 2, h=0, 1 or 2, and g+h=1, 2 or 3;
and optionally comprising other units of formula (II):

in which U has the same meaning as above and i=0, 1, 2 or 3, and b) the compound B is an organopolysiloxane comprising at least one unit of formula (III):

in which:
the radicals U, which are identical or different, represent a hydrocarbon radical having from 1 to 12 carbon atoms;
d=1 or 2, e=0, 1 or 2, and d+e=1, 2 or 3;
and optionally other units of formula (IV):

in which U has the same meaning as above and f=0, 1, 2 or 3.

12. A product comprising a compound C of formula (1):

in which:
the symbols R, which are identical or different, represent a hydrogen atom or a hydrocarbon radical having from 1 to 12 carbon atoms,
x=1, 2 or 3, and
y=1 or 2,
in the presence of a compound E of following formula (4):

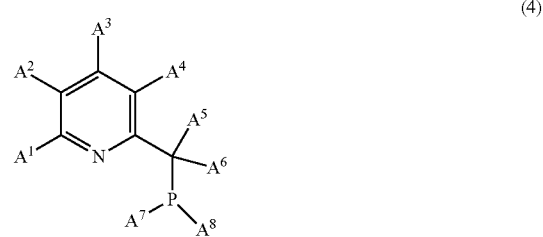

in which:
A¹, A², A³ and A⁴ are chosen from: the hydrogen atom, alkyl groups having from 1 to 8 carbon atoms, cycloalkyl groups having from 6 to 12 carbon atoms, aryl groups having from 6 to 12 carbon atoms, halogens, and alkoxy groups of formula OR¹ where R¹ is an alkyl group having from 1 to 8 carbon atoms,
A⁵ and A⁶ are chosen from: the hydrogen atom, alkyl groups having from 1 to 8 carbon atoms, cycloalkyl groups having from 6 to 12 carbon atoms, and aryl groups having from 6 to 12 carbon atoms, and
A⁷ and A⁸ are chosen from: alkyl groups having from 1 to 8 carbon atoms, cycloalkyl groups having from 6 to 12 carbon atoms, aryl groups having from 6 to 12 carbon atoms, and alkoxy groups of formula OR¹ where R¹ is an alkyl group having from 1 to 8 carbon atoms
as catalyst for hydrosilylation and/or dehydrogenative silylation between an unsaturated compound A and a compound B comprising at least one hydrosilyl functional group.

13. A composition X comprising:
at least one unsaturated compound A comprising at least one alkene functional group and/or one alkyne functional group,
at least one compound B comprising at least one hydrosilyl functional group, and
a compound C of formula (1):

in which:
the symbols R, which are identical or different, represent a hydrogen atom or a hydrocarbon radical having from 1 to 12 carbon atoms, and
x=1, 2 or 3, and
y=1 or 2.

14. The composition X as claimed in claim 13, additionally comprising a compound E of following formula (4):

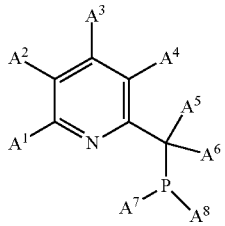
(4)

in which:
$A^1$, $A^2$, $A^3$ and $A^4$ are chosen from: the hydrogen atom, alkyl groups having from 1 to 8 carbon atoms, cycloalkyl groups having from 6 to 12 carbon atoms, aryl groups having from 6 to 12 carbon atoms, halogens, and alkoxy groups of formula $OR^1$ where $R^1$ is an alkyl group having from 1 to 8 carbon atoms,
$A^5$ and $A^6$ are chosen from: the hydrogen atom, alkyl groups having from 1 to 8 carbon atoms, cycloalkyl groups having from 6 to 12 carbon atoms, and aryl groups having from 6 to 12 carbon atoms, and
$A^7$ and $A^8$ are chosen from: alkyl groups having from 1 to 8 carbon atoms, cycloalkyl groups having from 6 to 12 carbon atoms, aryl groups having from 6 to 12 carbon atoms, and alkoxy groups of formula $OR^1$ where $R^1$ is an alkyl group having from 1 to 8 carbon atoms.

15. The composition X as claimed in claim 13, comprising:
at least one organopolysiloxane compound A comprising, per molecule, at least two $C_2$-$C_6$ alkenyl radicals bonded to silicon atoms,
at least one organohydropolysiloxane compound B comprising, per molecule, at least two hydrogen atoms bonded to an identical or different silicon atom,
at least one of said compound C, and
optionally at least one compound E of following formula (4):

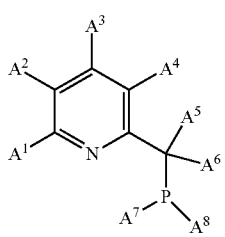
(4)

in which:
$A^1$, $A^2$, $A^3$ and $A^4$ are chosen from: the hydrogen atom, alkyl groups having from 1 to 8 carbon atoms, cycloalkyl groups having from 6 to 12 carbon atoms, aryl groups having from 6 to 12 carbon atoms, halogens, and alkoxy groups of formula $OR^1$ where $R^1$ is an alkyl group having from 1 to 8 carbon atoms,
$A^5$ and $A^6$ are chosen from: the hydrogen atom, alkyl groups having from 1 to 8 carbon atoms, cycloalkyl groups having from 6 to 12 carbon atoms, and aryl groups having from 6 to 12 carbon atoms, and
$A^7$ and $A^8$ are chosen from: alkyl groups having from 1 to 8 carbon atoms, cycloalkyl groups having from 6 to 12 carbon atoms, aryl groups having from 6 to 12 carbon atoms, and alkoxy groups of formula $OR^1$ where $R^1$ is an alkyl group having from 1 to 8 carbon atoms.

16. The composition X as claimed in claim 15, in which:
a) the unsaturated compound A is chosen from organopolysiloxane compounds comprising units of formula (I):

$$Z_g U_h SiO_{(4-(g+h))/2} \quad (I)$$

in which:
the radicals Z, which are identical or different, represent a linear or branched alkenyl or alkynyl radical having from 2 to 6 carbon atoms;
the radicals U, which are identical or different, represent a hydrocarbon radical having from 1 to 12 carbon atoms;
g=1 or 2, h=0, 1 or 2, and g+h=1, 2 or 3;
and optionally comprising other units of formula (II):

$$U_i SiO_{(4-i)/2} \quad (II)$$

in which U has the same meaning as above and i=0, 1, 2 or 3, and
b) the compound B is chosen from organopolysiloxanes comprising at least one unit of formula (III):

$$H_d U_e SiO_{(4-(d+e))/2} \quad (III)$$

in which:
the radicals U, which are identical or different, represent a hydrocarbon radical having from 1 to 12 carbon atoms;
d=1 or 2, e=0, 1 or 2, and d+e=1, 2 or 3;
and optionally other units of formula (IV):

$$U_f SiO_{(4-f)/2} \quad (IV)$$

in which U has the same meaning as above and f=0, 1, 2 or 3.

17. A crosslinked silicone material Y obtained by heating, to a temperature ranging from 15 to 200° C., a composition X as claimed in claim 15.

* * * * *